United States Patent [19]

Richardson et al.

[11] 3,906,365

[45] Sept. 16, 1975

[54] LIMITER CIRCUIT

[75] Inventors: Henry Allan Richardson; Daniele Sellari, Jr., both of Corinth, Miss.

[73] Assignee: International Telephone and Telegraph Corporation, New York, N.Y.

[22] Filed: June 21, 1974

[21] Appl. No.: 483,933

Related U.S. Application Data

[63] Continuation of Ser. No. 339,707, March 9, 1973, abandoned.

[52] U.S. Cl. .................. 328/31; 307/230; 307/237; 307/261; 328/169

[51] Int. Cl.[2] .......................................... H03K 5/08

[58] Field of Search .............. 328/28, 31, 168, 169; 307/230, 237, 261

[56] References Cited

UNITED STATES PATENTS

| | | | |
|---|---|---|---|
| 3,576,451 | 4/1971 | Markow | 307/237 |
| 3,639,779 | 2/1972 | Garrigus | 328/169 |
| 3,666,970 | 5/1972 | Abbott et al. | 307/237 |
| 3,697,780 | 10/1972 | Michael et al. | 307/237 |
| 3,721,835 | 3/1973 | Hess | 328/31 |

*Primary Examiner*—Siegfried H. Grimm
*Attorney, Agent, or Firm*—James B. Raden; Marvin M. Chaban

[57] ABSTRACT

In a multi-frequency receiver for use in telecommunications system, tones within the audio frequency range are received. The tones transmitted are separated, amplified, and shaped into square waveform for further processing. The pulse shaping or limiting, associated with amplifications produces square wave outputs of unvarying amplitude in response to sine wave inputs of varying amplitude. A common base voltage midway between the plus and minus voltage supplies is provided for both limiters. In each limiter, a voltage comparator is employed to trigger its output between two states responsive to an input signal. The voltage of the output state is independent of the input so long as the input exceeds a settable threshold.

4 Claims, 2 Drawing Figures

LIMITER CIRCUIT

This is a continuation of application Ser. No. 339,707 filed Mar. 9, 1973, now abandoned.

BACKGROUND OF THE INVENTION

The system within which a limiter of the type disclosed may operate is disclosed in greater detail in our copending application executed and filed with this application, entitled Multi-frequency Receiver, Ser. No. 339,562, now U.S. Pat. No. 3,845,249 issued Oct. 29, 1974.

In that system, multi-frequency signals are fed to the first analog stage of the receiver and tones below a predetermined frequency are deleted. Those within a first frequency range are passed along a first path and those within a second frequency range are passed along a second path. Signals passed by this analog stage are in a generally sinusoidal waveform in both the first range or the second range, these ranges being within the audio band. The signals in each range are individually amplified and shaped by the limiter stage for transmission to the second filtering stage. The second filtering stage comprises a plurality of band pass filters in each frequency range for selectively segregating specific frequency bands within each range.

A limiter of the type known in the art is shown in U.S. Pat. No. 3,076,059 to L.A. Meacham et al. on Jan. 29, 1963 Signalling System. In that disclosure a push-pull output stage comprised of two complimentary transistors is employed. In copending application Ser. No. 100,951 filed Dec. 23, 1970, now U.S. Pat. No. 3,743,945 issued July 3, 1973 by one of the joint inventors hereof a limiter for a similar field of use was disclosed and claimed. In that case, two amplifiers were used for each limiting function one for the positive portion of the signal and the other for the negative portion of the signal. The dual limiter disclosed provides two relatively independent limiter circuits each comprised of a voltage comparator circuit.

SUMMARY OF THE INVENTION

Each limiter circuit receives input tone signals in essentially sinusoidal form. The signals are applied to a voltage comparator, the comparator being similar to a flip flop in its operation. Each component of a received signal is compared against a reference potential derived from the last state of the comparator to trigger the comparator to change state when the signal reaches an amplitude greater than that of the reference potential applied to the comparator. Each comparator is referenced relative to a common intermediate ground to produce peak to peak amplitudes responsive to inputs of varying amplitude.

By this arrangement, each component of the input signal must be of predetermined minimum threshold or amplitude to generate an output signal the output signal being of essentially square wave at the same frequency as the input signal.

It is therefore an object of the invention to provide in a multi-frequency receiver a new and improved limiter receptive of voice frequencies of sinusoidal form to produce an essentially square wave output at frequency consistent with the received frequency.

It is a further object of the invention to provide a multi-frequency receiver limiter which uses as its major operative members integrated circuits requiring low power and low current.

It is a still further object of the invention to produce a multi-frequency limiter requiring one comparator to produce an output signal of proper waveform responsive to sinusoid input on its inputs.

Other objects, features and advantages of our invention will become clear from the accompanying drawings when viewed in conjunction with the following description.

DETAILED DESCRIPTION OF THE DRAWINGS

Figure 1:
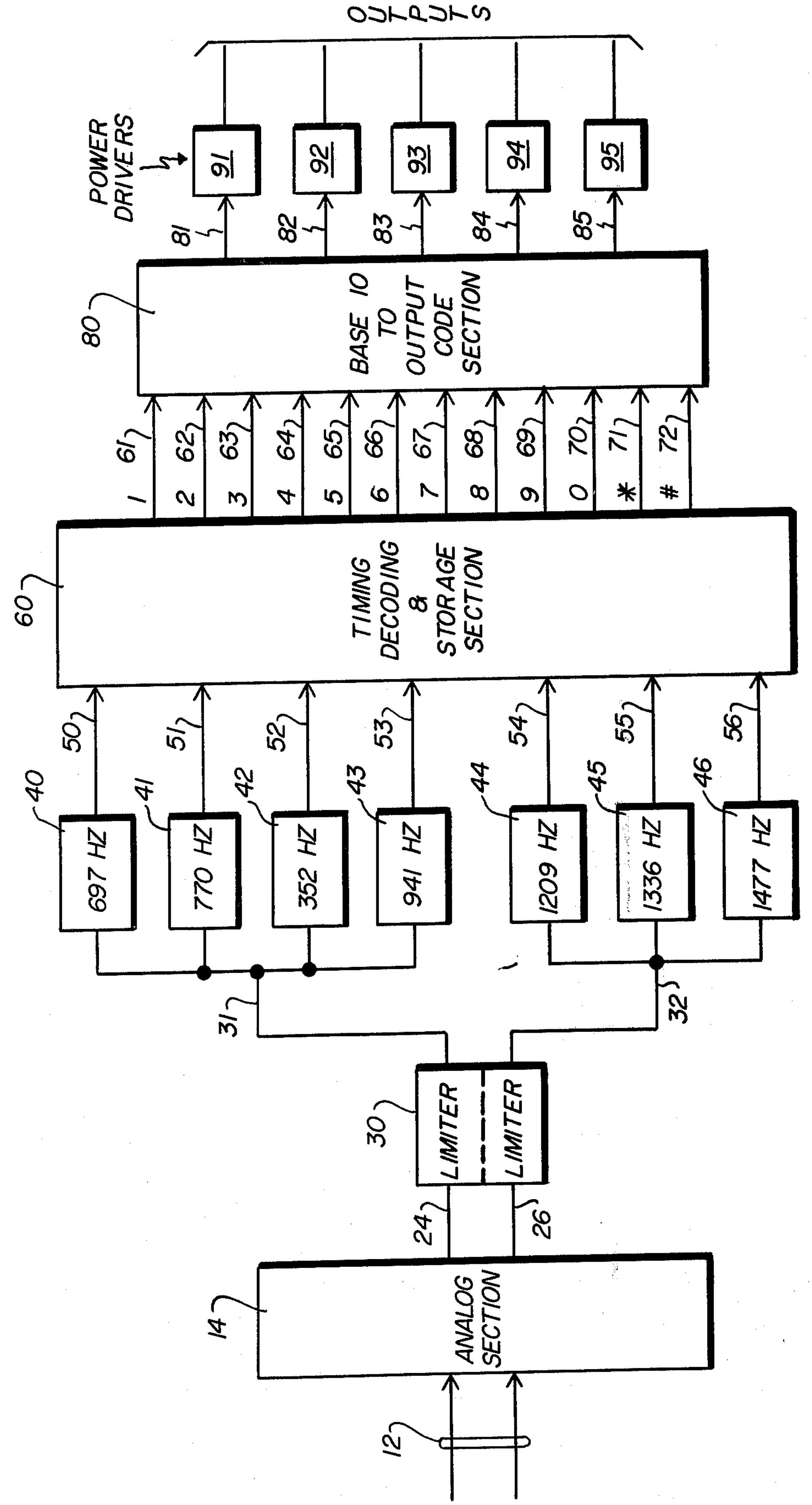
FIG. 1 is a schematic block circuit of a multi-frequency voice receiver employing our invention.

In FIG. 1, we show a system for receiving and validating tone signals generated at a station instrument and transmitted to the tone receiver and digit register. The input path 12 to the system may be derived from the common control (not shown), of telephone line circuit or from another suitable path, the signals received thereover having been originated at a telephone subscriber station or data transmission terminal instrument (not shown) having multi-frequency signal generation facility.

As is well-known in the art, suitable oscillators respond to the depression of push buttons at a telephone instrument or data terminal to produce multi-frequency tones within the voice frequency band corresponding to the respective push button depressed. The tones are transmitted over the line in the sequence generated. The signals making up the tones must be distinguished from any other tone or voices transmitted to the line, must be validated and translated into suitable binary digital code signals for transmission of the digital signal information to suitable memory equipment, switching systems or the like.

The frequencies employed have been standardized for telephone use. In general use at the present is the two out of eight code in which two frequencies out of the eight available constitute each digit. The frequencies are grouped into a high group and a low group, and a valid signal must include one frequency from each group. The generated signal must be of proper duration to differentiate from spurious signals and be classified as a valid signal. Each frequency signal must fall within a predetermined frequency range and be of at least minimum amplitude to be accepted and to constitute part of a valid signal.

The receiver of FIG. 1 is, of course, designed to accept such frequencies, separate true signals from one another, reject spurious signals and validate signals received. The receiver time, stores, decodes and codes the digits indicated by these signals in the following manner.

In FIG. 1, we show a pair of inputs referenced as leads 12 to analog section 14. The analog section serves four basic functions. This section (1) Bridges the telephone line with a high impedance across the line; (2) Rejects dial tone and other tones below 680 Hz; (3) Amplifies incoming signals to an amplitude sufficient to allow further processing of the signals and; (4) Separates the incoming frequency pair in respective individual frequencies. Circuits for performing these functions may be seen in the copending Sellari application (U.S. Pat. No. 3,743,945) as noted.

Signals passed by the respective band pass filters within the analog section on their respective output leads 24 and 26 are fed to the limiter circuits 30 which will be described herein in greater detail. The signals in the respective low and high groups are maintained separately, the signals are determined to be of sufficient amplitude to pass the acceptance threshold for shaping into an esentially square waveform. Output from the limiters 30 is in the form of high and low signals in essentially square wave with 50% duty cycles and equal amplitude high signals. These signals, are transmitted to the respective band pass filters of the low group on lead 31, and to the band pass filters of the high group on lead 32.

A multiple path from lead 31 feeds the respective band pass filters of the low group, filter 40 which passes the 697 Hz band, filter 41 which passes the 770 Hz band, filter 42 which passes the 852 Hz band and filter 43 which passes the 941 Hz band.

A multiple path from lead 32 is coupled to the respective band pass filters of the high group i.e., filter 44 for 1209 Hz band, filter 45 for the 1336 Hz band and filter 46 for the 1477 Hz band. Where only ten digits plus two other symbols and no other code signals are being used in the system, the eighth filter for 1633 Hz may be omitted (as shown) or its output may be blanked as this frequency is used only for adding digital information separate from the ten element, binary decimal digit system employed for telephone switching.

Each of these band pass filters passes a frequency band within 2 to 2½ percent of the basic frequency for that filter, the emitted signal being sinusoidal in form. The individual filters 40–46 pass their respective output frequency bands to the Timing, Decoding and Storage Section over the respective leads 50–56. Section 60 serves to validate the received signals for minimum duration for strength and for group positioning and will decode the signals for storage.

Figure 2:
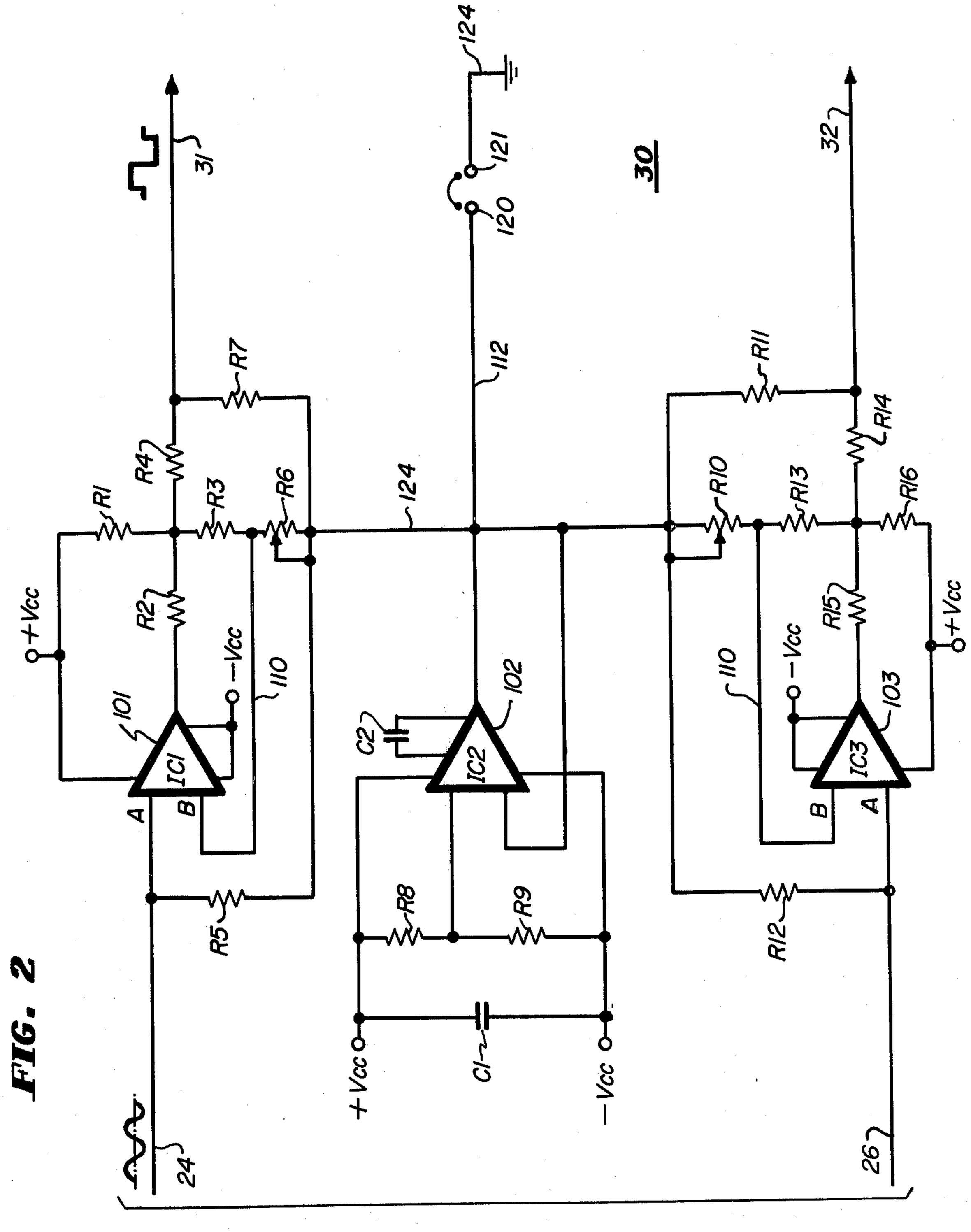
FIG. 2 is a schematic circuit diagram of the limiter employing our invention.

Within section 60, the signal is timed for duration, checked for amplitude and validity, stored and decoded into a base ten code output to the base 10 code section 80. In code section 80, the base ten output signal is again coded and the output signals are transmitted to power drivers 91–95 for raising the power level of the outputs to levels suitable for use in operating external equipment. The dual limiter shown in FIG. 2 serves to provide separate square waves over its output leads 31 (low frequency group) and 32 (high frequency group) in response to separate sinusoidal inputs over its respective input leads 24 and 26. The dual limiter further serves the function of selecting input signals above an adjustable threshold level and rejecting signals below that level. The limiting functions for each group are performed independently of one another except that a common amplifier 102 may be used for providing the intermediate ground level for both integrated circuit comparators 101 and 103. Each such comparator may be of many known designs which invert a signal in its output response. One preferable comparator which responds to voltage levels on one input lead "A" relative to the voltage on the threshold lead "B" to open or close a path from —Vcc to the output lead. Thus, in the circuit disclosed an amplifier common to both limiters is provided, with only one comparator and its ancillary circuitry necessary to provide each output square wave.

The basic function of the present limiter is the same as that of known limiters employed in VF receivers, the means of performing that function being different. For sine wave inputs of varying amplitudes, the output waveform ordered must be an almost perfect square wave of unvarying peak to peak amplitude. For input signal below a threshold amplitude there is to be no square wave output. The minimum level should be adjustable. For signals above this amplitude threshold, the output as noted is produced.

The input signal in the form of a sinusoidal wave may be capacitive coupled at its output from the prior stage and referenced across resistor R5 relative to the output of amplifier 102 called ground herein. Integrated circuit 101 is a voltage comparator, therefore, when the input level at terminal "A" of amplifier 101 exceeds the threshold level at its terminal "B" the output of the comparator is switched. The threshold level is determined by the output state of the comparator and the resistor network (R1–R6). Since the threshold level is of the same polarity as the comparator output, the switching is reinforced by the regenerative loop formed.

Assume that the threshold is initially at its positive level. As the input goes above this level, the comparator output is switched to its negative state. The threshold on pin terminal B becomes negative, and the input must now go below this negative level before the output switches back to its positive state. This operation repeats for each cycle of the sine wave input. The positive and negative thresholds are of the same magnitude, therefore the output produced has a 50/50 duty cycle output. The output magnitude is determined by the voltage divider network of resistors R4 and R7 which gives a wide range of output levels that can be selected by varying the resistor values. Positive voltage is supplied to the divider network through resistor R1 and negative voltage is supplied from the comparator output (open collector) through resistor R2. The drop across resistor R2 matches the positive and negative levels across the divider network.

The internal ground level voltage generation by amplifier 102 is provided by using resistors R8 and R9 of equal resistance across the +Vcc and —Vcc supplies creating a voltage level that is half way between the two supplies called ground herein. The operational amplifier 102 voltage follower then provides an accurate internal ground for the system. Outputs are loaded by very high impedance of operational amplifier voltage followers. By the use of the circuit including amplifier 102 an accurate base voltage is provided, the base voltage being one adapted for use with integrated circuits. If ground is present in the system, the separated terminals 120 and 121 on lead 112 may be strapped to connect the common reference ground source lead 124 to the voltage divider networks comprised of resistors R1, R3 and R6 for IC1 and resistors R10, R13 and R16 as viewed in FIG. 2. With this ground, the circuit of IC2 could be omitted, as the described function of the circuit of IC2 is to provide an accurate ground level.

With the limiter circuit shown, the feedback path over lead 110 performs two functions (1) This path maintains the comparator in the state to which it has switched, and (2) provides the threshold level for the comparator input.

In the operation of the limiter including comparator 101, when the sine wave input begins its positive build up and increases to a value greater than the threshold value, comparator 101 changes state and its output goes to —Vcc. With —Vcc at the output of 101, output lead 31 assumes a negative voltage level somewhat less than —Vcc, due to the effect of resistor R4. The output voltage remains in this condition until the input on lead 24 becomes more negative than the negative threshold caused by the inverted output of the comparator.

When the input signal reverses and the sine wave input becomes more negative than the negative threshold value, the comparator switches restoring to what may be considered its normal condition. The effect of +Vcc controls and the threshold on the "B" terminal becomes positive. The output voltage is dependent on +Vcc.

In this way, once the input voltage is greater than the threshold to cause the comparator to switch, the output amplitude occurs at the output level determined by +Vcc, —Vcc and the voltage dividers. The output condition occurs regardless of the input amplitude once the threshold switching voltage level is reached. The output frequency of the square wave is of course dependent on the input frequency.

The operation of our limiter may be briefly described as follows: The switch internal comparator is open, —Vcc is disconnected from the resistor network and +Vcc is supplied to the resistor network via R1 to ground through resistors R3 and R6. For this state, the output and threshold levels are positive. When the internal comparator switch is closed, —Vcc is supplied to the resistor network via R2 and +Vcc is supplied to the resistor network via R1. Since the resistance of R2 is much lower than R1, the potential across the resistor network is negative. Therefore, the output and threshold levels are negative.

The values of R1 and R2 were chosen so that the positive potential across the network is equal in magnitude to the negative potential across the network for the two respective states, this condition is necessary to provide symmetrical thresholds.

We claim:

1. A limiter circuit for producing a square wave output in response to a sinusoidal signal input of more than a predetermined amplitude, the apparatus comprising a single operational amplifier having a first and a second input, a passive feedback network coupled to said first input of said amplifier for switching the voltage level to said first input responsive to changes in output from said amplifier, said feedback network including a portion of a resistive voltage divider across a source of direct current, an adjustable threshold setting means providing a reference voltage to said first input, the second input coupled to a source of sinusoidal signals to provide a signal from said sinusoidal signal input for comparison with the amplitude of said first input of said amplifier wherein said amplifier responds to signals at said second input above said threshold to produce a square wave output of the same polarity as the input signal.

2. A limiter circuit comprising, in combination: a comparator amplifier having first and second inputs and an output, means for coupling an input signal to said first input, means for deriving an output signal from said output of said comparator amplifier, a resistive divider coupled between a point of reference potential and a point of fixed potential with respect to said point of reference potential, said resistive divider being coupled at a first intermediate point to said output of said comparator amplifier, and said resistive divider being coupled at a second intermediate point to said second input of said comparator amplifier and said resistive divider having a value such that the magnitude of the potential applied to said second input of said comparator amplifier is constant irrespective of the output state of said comparator amplifier.

3. The limiter according to claim 2, wherein said voltage divider comprises a first resistive impedance coupled between said point of fixed potential and said first intermediate point, a second resistive impedance coupled between said first and second intermediate points, a third resistive impedance coupled between said second intermediate point and said point of reference potential, and a fourth resistive impedance coupled between the output of said comparator amplifier and said first intermediate point.

4. The limiter according to claim 3, wherein said third resistive impedance is variable so that the magnitude of said potential at said second input varies in accordance with the value of said variable impedance.

* * * * *